May 25, 1943. L. S. WALLIS 2,320,020
SPRING MATTRESS AND THE LIKE
Filed May 12, 1941
FIG. 1
FIG. 2
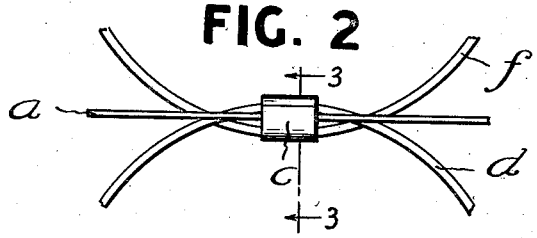
FIG. 3
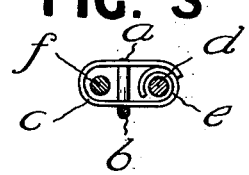
FIG. 4
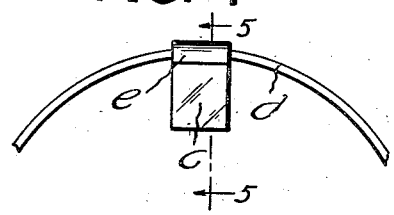
FIG. 5
FIG. 6
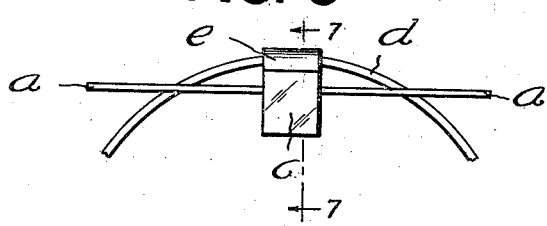
FIG. 7
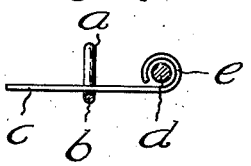
FIG. 8
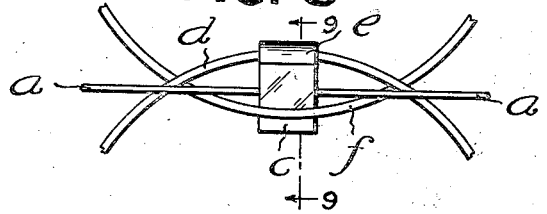
FIG. 9
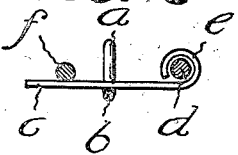
FIG. 10
FIG. 11
INVENTOR
LIONEL SELBY WALLIS
By Dawson Ooms & Booth
Attorneys Patented May 25, 1943

2,320,020

UNITED STATES PATENT OFFICE 2,320,020

SPRING MATTRESS AND THE LIKE

Lionel Selby Wallis, Birmingham, England

Application May 12, 1941, Serial No. 393,003
In Great Britain August 15, 1940

4 Claims. (Cl. 5—267)

This invention relates to improvements in spring mattresses, seats and the like in which a number of upholstery springs are assembled together in parallel rows and the end coils of adjacent springs are interconnected.

One object of my invention is to provide improved means for interconnecting the end coils of the springs. Another object is to provide a spring connecting means which is simple and cheap to manufacture and can be very easily applied either by hand or by machine. A further object is to provide a spring connecting means which effectively holds a spring against displacement in a horizontal direction relative to the adjacent springs but does not affect the flexibility of the spring surface.

According to my invention the end coils of adjacent springs are arranged to overlap, a stepped or cranked portion of a connecting wire extending at right angles to a line joining the axes of the springs is entered between the overlapping parts of the springs, and the connection is completed by a sheet or strip metal band or wire clip which passes between the stepped portion of the connecting wire and the adjacent parts of the spring coils and is folded or closed around these parts of the coils.

The connecting wire conveniently extends for the full width or length of the assembly, stepped or cranked portions being formed in it at intervals corresponding to the spacing between the rows of springs, and the ends of the wires may be anchored to a metal or other frame enclosing the assembly.

The stepped or cranked part of the connecting wire prevents relative movement between the spring coils in a direction at right angles to a line joining their axes and the band or clip prevents movement in the direction of that line, so that each spring is effectively located relative to the adjacent springs, but as each spring coil can rock freely about a horizontal axis within the band or clip the flexibility of the spring surface is not impaired at all.

One practical form of connection in accordance with my invention and a slight modification are illustrated in the accompanying drawing in which—

Figure 1 is a side elevation of the connecting wire.

Figure 2 is a plan of the connection and

Figure 3 is a cross-section on the line 3—3 of Figure 2.

Figure 4 is a plan showing the first stage in the formation of the connection and Figure 5 is a section on the line 5—5 of Figure 4.

Figure 6 is a plan showing the second stage and

Figure 7 is a section on the line 7—7 of Figure 6.

Figure 8 is a plan showing the third stage and

Figure 9 is a section on the line 9—9 of Figure 8.

Figure 10 is a fragmentary view of a part of a modified connecting wire for use with a wire clip.

Figure 11 is a plan of a connection made with a wire clip.

For clearness, the sections have been drawn on a larger scale than the other views.

As shown in Figure 1 the connecting wire is a resilient steel wire $a$ having short rectangular portions $b$ stepped out of the line of the wire at intervals corresponding to the spacing of the springs to be joined. The other part of the connection is a metal strip $c$ which is formed into a clip around the spring coils and over the connecting wire in the successive steps shown in the drawing. The width of the strip is such that it will fit freely into the stepped part of the connecting wire.

The first step is to roll one end of the strip $c$ around one spring coil $d$ as shown in Figures 4 and 5 to form an eye $e$ by which the strip is pivotally connected to the coil. The connecting wire $a$ is then placed over the spring coil with the stepped part $b$ under the strip as shown in Figures 6 and 7. Next the other spring coil $f$ is fitted under the first coil and under the connecting wire and over the strip as shown in Figures 8 and 9, and the free end of the strip is folded up and over to form a closed clip enclosing the spring coils as shown in Figures 2 and 3.

A wire clip may be used instead of the metal strip and in that case the connecting wire has a stepped portion $g$ of shallow V outline instead of the rectangular stepped part. The wire clip is applied in the same way as the band described above and the finished connection is shown in Figure 11.

The connecting wire will normally extend for the full width or length of the assembly and the ends of the wires may be anchored to a metal or other frame enclosing the assembly or they may be secured in any other convenient manner.

The band or clip may be applied to the spring coils and folded around them by hand or it may be applied by a suitable machine, and in building up a spring assembly the machine may be designed to apply and fold a number of bands or clips simultaneously.

I claim:

1. A spring assembly comprising a pair of adjacent upholstery springs of which the top end coils overlap, a wire extending over said overlapped parts substantially at right angles to a line joining the axes of the springs, a rectangular downwardly stepped portion of said wire entering between said overlapped parts, and a strip metal band clip of such a width that it fits within the stepped portion of the wire, said clip passing over the downwardly stepped portion of the wire and under the overlapped parts and being folded around said overlapped parts hingedly to connect therewith.

2. A spring assembly comprising a pair of adjacent upholstery springs of which the top end coils overlap, a wire extending over said overlapped parts substantially at right angles to a line joining the axes of the springs, a downwardly stepped portion of shallow V outline in said wire entering between said overlapped parts, and a wire clip which passes over the stepped portion of the wire and under the overlapped parts and is folded around said overlapped parts hingedly to connect therewith.

3. A spring assembly comprising a pair of adjacent upholstery springs having the top end coil of one spring overlapping that of the other, a wire extending over said overlapped parts substantially at right angles to a line joining the axes of the springs, a downwardly stepped portion on said wire entering between said parts, and a clip pivotally connected at one end to the upper spring coil and passing over said stepped portion of the wire and under the lower spring coil and being folded back up and over to form a closed member which encloses the overlapped parts of the spring coils and in which each of said parts can hinge freely.

4. A spring assembly comprising a plurality of upholstery springs arranged in parallel rows within a frame with the top end coils of aligned springs in adjacent rows overlapping, wires extending over the overlapped parts of the springs in a direction at right angles to lines joining the axes of the springs, said wires having downwardly stepped portions which are spaced apart at the same spacing as the springs and which enter between the overlapped parts of the springs, means connecting the ends of the wires to the frame, and clips passing over the downwardly stepped parts and under the end spring coils and folding around said spring coils hingedly to connect therewith.

LIONEL SELBY WALLIS.